J. E. DAWSEY.
SPRING WHEEL.
APPLICATION FILED MAY 28, 1914.
1,140,963.
Patented May 25, 1915.
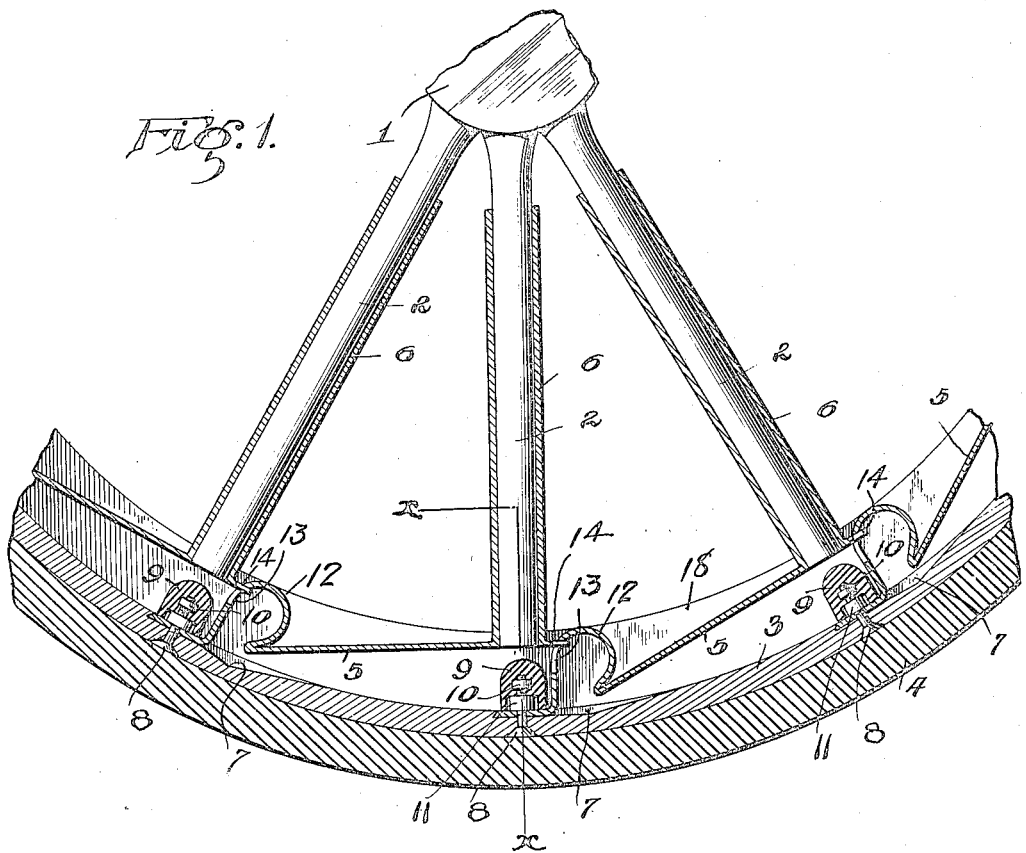
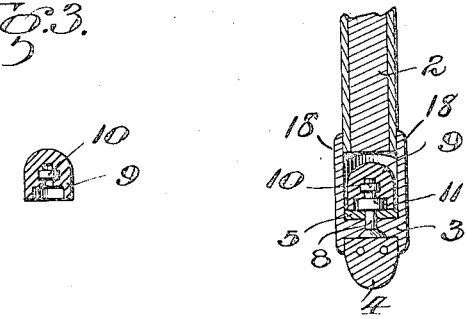
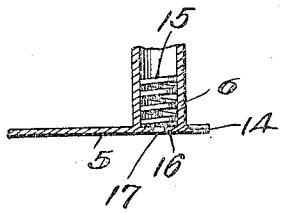
Inventor
John E Dawsey
Witnesses:

UNITED STATES PATENT OFFICE.

JOHN E. DAWSEY, OF CONWAY, SOUTH CAROLINA.

SPRING-WHEEL.

1,140,963.  Specification of Letters Patent.  Patented May 25, 1915.

Application filed May 28, 1914. Serial No. 841,675.

*To all whom it may concern:*

Be it known that I, JOHN E. DAWSEY, a citizen of the United States, residing at Conway, in the county of Horry and State of South Carolina, have invented new and useful Improvements in Spring-Wheels, of which the following is a specification.

This invention relates to spring wheels, the object in view being to provide a novel combination of hub, spokes and rim, together with means for yieldingly supporting the rim or felly in relation to the spokes and hub, whereby all shocks and vibrations are absorbed between the rim or felly and the remainder of the wheel, thus doing away with the necessity of using pneumatic tires and consequently avoiding punctures, blow outs and other troubles incident to the use of such tires.

With the above and other objects in view, the invention consists in the novel construction, combination and arrangement of parts, as herein described, illustrated and claimed.

In the accompanying drawings:—Figure 1 is a side elevation partly in section of a portion of a vehicle wheel illustrating the present invention. Fig. 2 is a cross section through the same on the line $x$—$x$ of Fig. 1. Fig. 3 is a detail section through the rubber cushion or buffer taken on the same line as Fig. 2. Fig. 4 is a fragmentary section through one of the main supporting springs and a portion of the guide tube carried thereby, showing an auxiliary cushion for one of the spokes.

Referring to the drawings 1 designates the hub, 2 the spokes and 3 the rim or felly of a wheel, the spokes 2 being fixedly connected at their inner extremities to the hub and not directly connected in any way to the rim or felly 3, the latter therefore being adapted to yield relatively to the extremities of the spokes as will hereinafter appear.

4 designates a tire of any desired construction, the same being shown in the form of a solid rubber or cushion tire fastened to the rim or felly 3 in any convenient way.

The rim and spokes are connected for relative yielding movement by means of a circular series of strap springs 5 as shown in Fig. 1, each of said springs being provided at its free extremity with a radially disposed guide tube or sleeve 6 in which one of the spokes 2 is received and adapted to slide. The rim or felly 3 is recessed as shown at 7 to admit of the flexing of the springs 5. One end of each spring is connected in fixed relation to the rim or felly 3 by means of a countersunk bolt 8, said bolt also serving to fasten to the rim a rubber cushion or buffer 9 provided with a recess in which is contained a nut 10 which receives the bolt 8. Another nut 11 is threaded on the bolt 8 and binds the extremity of the spring 5 against the rim 3 as clearly shown in Figs. 1 and 2.

Between its ends each of the springs 5 is bent to form a resilient loop 12 which adds very much to the flexibility and efficiency of the spring and said loop is provided with a slot 13 therein which receives a guiding tongue 14 formed at the free extremity of the adjacent spring 5 as clearly shown in Fig. 1. This provides for the relative yielding movement of the springs while keeping the same from moving laterally in relation to each other.

In some cases it may be found desirable to provide an auxiliary cushioning spring 15 as shown in Fig. 4 and where such a spring is used in connection with each of the spokes 2, the lower extremity of the guide tube 6 is partly closed by an end wall 16, the latter being, however, provided with an air vent hole 17 to avoid the formation of an air cushion between the extremity of the spoke and the wall 16, allowing the cushioning spring 15 to operate freely.

It will be noted in the drawings that a buffer or rubber cushion 9 is arranged in line with and adapted to be struck by the extremity of each spoke thereby limiting the movement of the spoke and also the spring 5 with which said spoke is associated. The looped portion 12 of each spring allows the spring as a whole to extend itself in a longitudinal direction, thereby permitting the ends of the spokes to yield circumferentially or longitudinally of the rim or felly while others move in radial lines. For instance, the spokes which stand vertically at the top and bottom of the wheel will move radially with respect to the axis of the wheel while those spokes which extend horizontally will yield vertically and therefore the ends of the spokes will move longitudinally of the rim. The special formation of the springs 5 as shown and described provides for such variable movement of the springs and enables them to accommodate the varied movements of the spokes referred to.

If desired, the spokes 2 may fit tightly within the tubes 6 so that the springs 5 will resist the radial movements of the spokes, as well as the other movements of the spokes when out of a vertical line. As shown in Figs. 1 and 2, the rim 3 is provided with parallel inwardly extending flanges 18 between which the guide tubes 6 and springs 5 slide, to prevent relative lateral movement between the spokes and rim or felly.

What I claim is:—

1. In a spring wheel, a hub, spokes fastened at their inner extremities thereto, a rim movable in relation to the outer extremities of the spokes, strap springs fastened at one end to said rim, sleeves having a fixed relation to and carried by the free extremities of said springs in which the spokes are received, and cushions on the rim against which the extremities of the spokes are adapted to strike, each of said springs having a portion thereof bent into a resilient loop, the adjacent spring having a sliding connection with said loop.

2. In a spring wheel, a hub, spokes fastened at their inner extremities thereto, a rim movable in relation to the outer extremities of the spokes, strap springs fastened at one end to said rim, tubular guides having a fixed relation to and carried by the free extremities of said springs through which the spokes are slidable, cushions on the rim against which the extremities of the spokes are adapted to strike, each of said springs having a portion thereof bent into a resilient loop, and a tongue on the free extremity of each spring having a slidable engagement with the loop of the adjacent spring.

3. In a spring wheel, a hub, spokes fastened at their inner extremities thereto, a rim movable in relation to the outer extremities of the spokes, strap springs fastened at one end to said rim, tubular guides having a fixed relation to and carried by the free extremities of said springs through which the spokes are slidable, cushions on the rim against which the extremities of the spokes are adapted to strike, each of said springs having a portion thereof bent into a resilient loop, and a tongue on the free extremity of each spring having a slidable engagement with the loop of the adjacent spring, said loop being formed with a guideway for said tongue.

In testimony whereof, I affix my signature in the presence of two witnesses.

JOHN E. DAWSEY.

Witnesses:
D. G. SPIVEY,
F. M. FLOYD.